(12) United States Patent
Liang

(10) Patent No.: US 9,256,256 B2
(45) Date of Patent: Feb. 9, 2016

(54) FIXING MECHANISM AND EXTERNAL ELECTRONIC DEVICE THEREOF

(71) Applicant: Wistron Corporation, New Taipei (TW)

(72) Inventor: Chen-Yi Liang, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 221 days.

(21) Appl. No.: 14/194,809

(22) Filed: Mar. 2, 2014

(65) Prior Publication Data

US 2015/0138721 A1     May 21, 2015

(30) Foreign Application Priority Data

Nov. 18, 2013  (TW) .............................. 102141905 U

(51) Int. Cl.
| | |
|---|---|
| *G06F 1/16* | (2006.01) |
| *F16M 11/10* | (2006.01) |
| *F16M 11/16* | (2006.01) |
| *F16M 13/00* | (2006.01) |

(52) U.S. Cl.
CPC .............. *G06F 1/1632* (2013.01); *F16M 11/10* (2013.01); *F16M 11/16* (2013.01); *F16M 13/00* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,317,315 B1 * | 11/2001 | Lee | ................... | G06F 1/1601 16/254 |
| 7,599,178 B2 * | 10/2009 | Huang | ................ | G06F 1/1632 361/679.28 |
| 8,208,245 B2 * | 6/2012 | Staats | .................. | G06F 1/162 361/679.02 |

(Continued)

FOREIGN PATENT DOCUMENTS

TW          M456677         7/2013

OTHER PUBLICATIONS

Office action mailed on Sep. 24, 2015 for the Taiwan application No. 102141905, filing date: Nov. 18, 2013, p. 2-3 and p. 4 line 1-16 and 20-23.

*Primary Examiner* — Lisa Lea Edmonds
(74) *Attorney, Agent, or Firm* — Winston Hsu; Scott Margo

(57) ABSTRACT

A fixing mechanism includes a base, a supporter, a torsional component, an actuating component and a resilient component. The supporter is rotatably disposed on the base. The torsional component is disposed on the base and has a first engaging portion. The actuating component is disposed on the supporter and is further movably switched between a first position and a second position. The actuating component has a second engaging portion. The actuating component moves from the first position to the second position to engage the second engaging portion with the first engaging portion. Two ends of the resilient component are respectively connected to the supporter and the base. When the second engaging portion is disengaged from the first engaging portion, the resilient component rotates the supporter relative to the base. A rotary angle between the supporter and the base is fixed by the torsional component via the actuating component.

20 Claims, 10 Drawing Sheets

(56) References Cited

U.S. PATENT DOCUMENTS

| | | | | |
|---|---|---|---|---|
| 8,223,483 B2* | 7/2012 | Hayashida | G06F 1/1632 | 361/679.41 |
| 8,323,040 B2* | 12/2012 | Prest | H01R 13/44 | 439/131 |
| 8,599,542 B1* | 12/2013 | Healey | G06F 1/1626 | 345/168 |
| 8,934,232 B2* | 1/2015 | Hsu | G06F 1/1626 | 248/919 |
| 9,001,508 B2* | 4/2015 | Mori | H05K 5/0217 | 361/679.55 |
| 9,007,761 B2* | 4/2015 | Wolff | G06F 1/1632 | 361/679.43 |
| 9,075,573 B2* | 7/2015 | Hayashida | G06F 1/16 | |
| 9,141,146 B2* | 9/2015 | Ke | G06F 1/1632 | |
| 2002/0145846 A1* | 10/2002 | Helot | G06F 1/1683 | 361/679.27 |
| 2004/0246666 A1* | 12/2004 | Maskatia | G06F 1/1616 | 361/679.57 |
| 2012/0212900 A1 | 8/2012 | Hung | | |
| 2013/0050933 A1* | 2/2013 | Prest | H01R 35/00 | 361/679.41 |
| 2013/0188304 A1 | 7/2013 | Lee | | |

\* cited by examiner

FIXING MECHANISM AND EXTERNAL ELECTRONIC DEVICE THEREOF

BACKGROUND OF THE DISCLOSURE

1. Field of the Disclosure

The present disclosure relates to a fixing mechanism and a related external electronic device, and more particularly, to a fixing mechanism and a related external electronic device capable of providing support function by torsion force and automatic recovery function according to assembly/disassembly of the portable electronic device.

2. Description of the Prior Art

The electronic devices, such as tablet computers, are popular information technology products in the electronic products market presently. Tablet computers can be collocated with a base for supporting the tablet computer or providing a key-in function. For example, when it is desired to utilize the tablet computer in a notebook computer mode, the tablet computer can be inserted into a sound box or the base with a keyboard. There is a rotary slot disposed on the conventional base. The conventional tablet computer is assembled with the rotary slot to rotate relative to the conventional base for adjusting a view angle of the tablet computer. However, the rotary slot stays at the present angle/position when the conventional tablet computer is disassembled from the rotary slot. The rotary slot partly protrudes from a main structure of the conventional base, and the rotary slot is easily damaged by hitting the tablet computer or the other objects.

SUMMARY OF THE DISCLOSURE

The present disclosure provides a fixing mechanism and a related external electronic device capable of providing support function by torsion force and automatic recovery function according to assembly/disassembly of the portable electronic device for solving above drawbacks.

According to the claimed disclosure, a fixing mechanism includes a base, a supporter, a torsional component, an actuating component and a resilient component. The supporter is rotatably disposed on the base for supporting a portable electronic device. The torsional component is disposed on the base. The torsional component includes a first engaging portion. The actuating component is disposed on the supporter and movably switched between a first position and a second position. The actuating component includes a second engaging portion. The portable electronic device is assembled with the supporter to push the actuating component from the first position to the second position, so as to engage the second engaging portion with the first engaging portion. Two ends of the resilient component are respectively connected to the supporter and the base. The resilient component is adapted to rotate the supporter relative to the base when the second engaging portion is disengaged from the first engaging portion. A rotary angle between the supporter and the base is fixed by the torsional component via the actuating component.

According to the claimed disclosure, the actuating component partly inserts into an inner space of the supporter when locating at the first position, the actuating component is ejected from the inner space of the supporter when locating at the second position.

According to the claimed disclosure, the first engaging portion is a polygon structure, and the second engaging portion is a clamp structure. At least two inner surfaces of the clamp structure symmetrically contact against outer surfaces of the polygon structure.

According to the claimed disclosure, the fixing mechanism further includes a rotary shaft rotatably disposed on the base and connected to the supporter. The resilient component is disposed on the rotary shaft.

According to the claimed disclosure, the fixing mechanism further includes a recovering component. Two ends of the recovering component are respectively connected to the supporter and the actuating component.

According to the claimed disclosure, the recovering component moves the actuating component from the second position to the first position when the portable electronic device is disassembled from the supporter, so as to disengage the second engaging portion from the first engaging portion.

According to the claimed disclosure, the fixing mechanism further includes a constraining component disposed on the supporter and passing through a constraint slot on the actuating component.

According to the claimed disclosure, the fixing mechanism further includes an accommodating structure and a first magnetic component. The accommodating structure is disposed on the supporter. The first magnetic component is movably disposed inside the accommodating structure. The first magnetic component is adapted to move relative to the accommodating structure for being close to a second magnetic component of the portable electronic device.

According to the claimed disclosure, the fixing mechanism further includes a permeance component disposed inside the accommodating structure to generate a magnetic attraction force with the first magnetic component.

According to the claimed disclosure, the actuating component is selectively disposed on a long lateral side or a short lateral side of the supporter.

According to the claimed disclosure, an external electronic device for being assembled with a portable electronic device is disclosed. The external electronic device includes a casing and a fixing mechanism. The fixing mechanism is disposed on the casing. The fixing mechanism includes a base, a supporter, a torsional component, an actuating component and a resilient component. The supporter is rotatably disposed on the base for supporting the portable electronic device. The torsional component is disposed on the base. The torsional component includes a first engaging portion. The actuating component is disposed on the supporter and movably switched between a first position and a second position. The actuating component includes a second engaging portion. The portable electronic device is assembled with the supporter to push the actuating component from the first position to the second position, so as to engage the second engaging portion with the first engaging portion. Two ends of the resilient component are respectively connected to the supporter and the base. The resilient component is adapted to rotate the supporter relative to the base when the second engaging portion is disengaged from the first engaging portion. A rotary angle between the supporter and the base is fixed by the torsional component via the actuating component.

The fixing mechanism and the related external electronic device of the present disclosure can provide the torsion force according to assembly of the portable electronic device, and further can automatically store the fixing mechanism according to disassembly of portable electronic device for preferable operational convenience.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
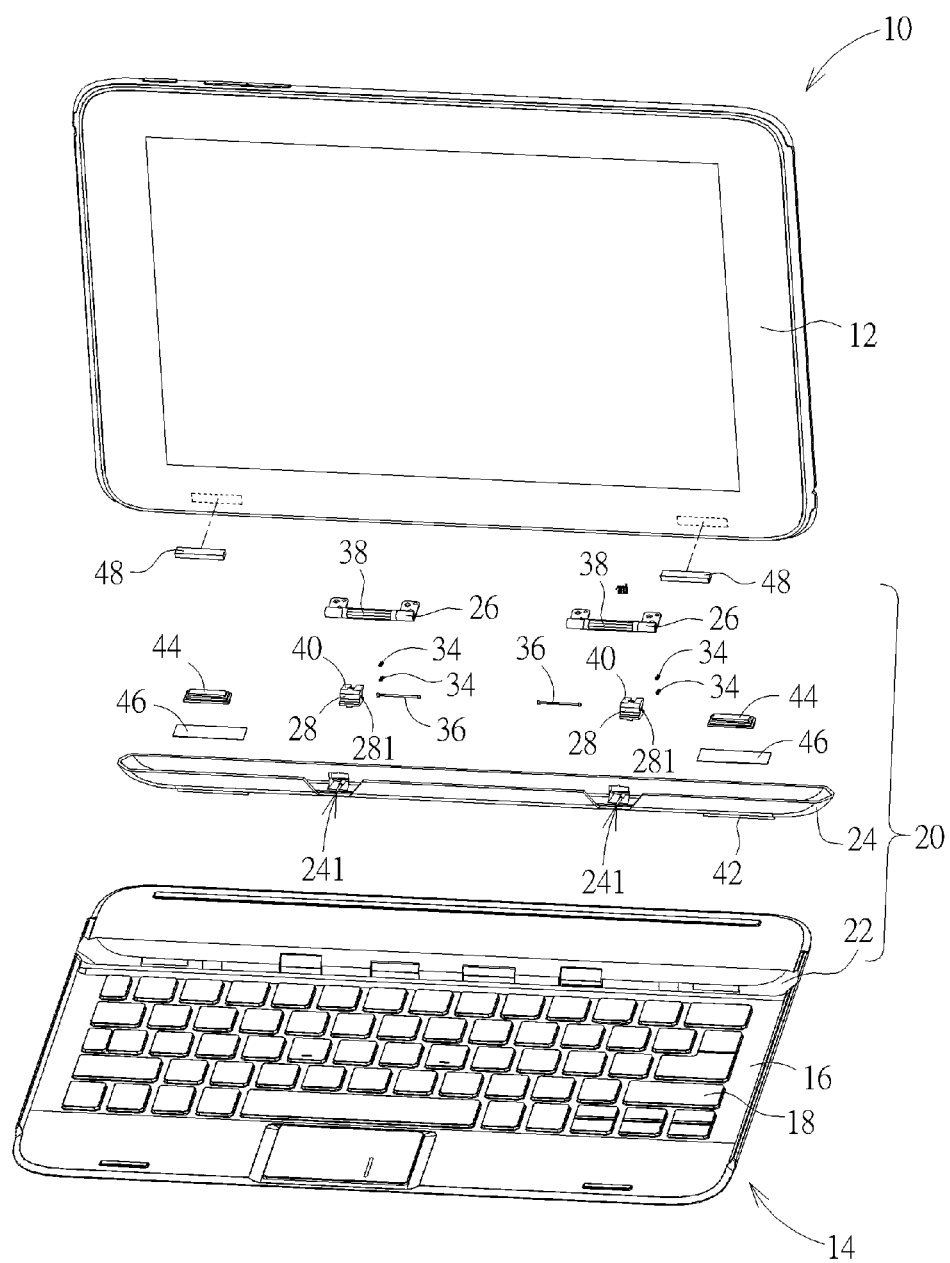
FIG. 1 is an exploded diagram of a computer system according to an embodiment of the present disclosure.

Please refer to FIG. 1. FIG. 1 is an exploded diagram of a computer system 10 according to an embodiment of the present disclosure. The computer system 10 includes a portable electronic device 12 and an external electronic device 14. The portable electronic device 12 can be a tablet computer with a touch screen. The external electronic device 14 can be a fixing device with the keyboard, the touch board and the sound box, or the fixing device only with the sound box. The external electronic device 14 includes a casing 16, an input module 18 and a fixing mechanism 20. The input module 18 is disposed on the casing 16 and can be the keyboard or the touch board as mentioned above. When the portable electronic device 12 is electrically connected to the external electronic device 14, an input command generated by the input module 18 can be utilized to control application programs of the portable electronic device 12. The portable electronic device 12 is electrically connected to the external electronic device 14 via a wire communication or a wireless communication. The fixing mechanism 20 is movably disposed inside the casing 16, and several components of the fixing mechanism 20 can be exposed out of the casing 16. The fixing mechanism 20 is utilized to hold the portable electronic device 12. An inclined angle of the portable electronic device 12 relative to the external electronic device 14 can be adjusted by the fixing mechanism 20.

Figure 2:
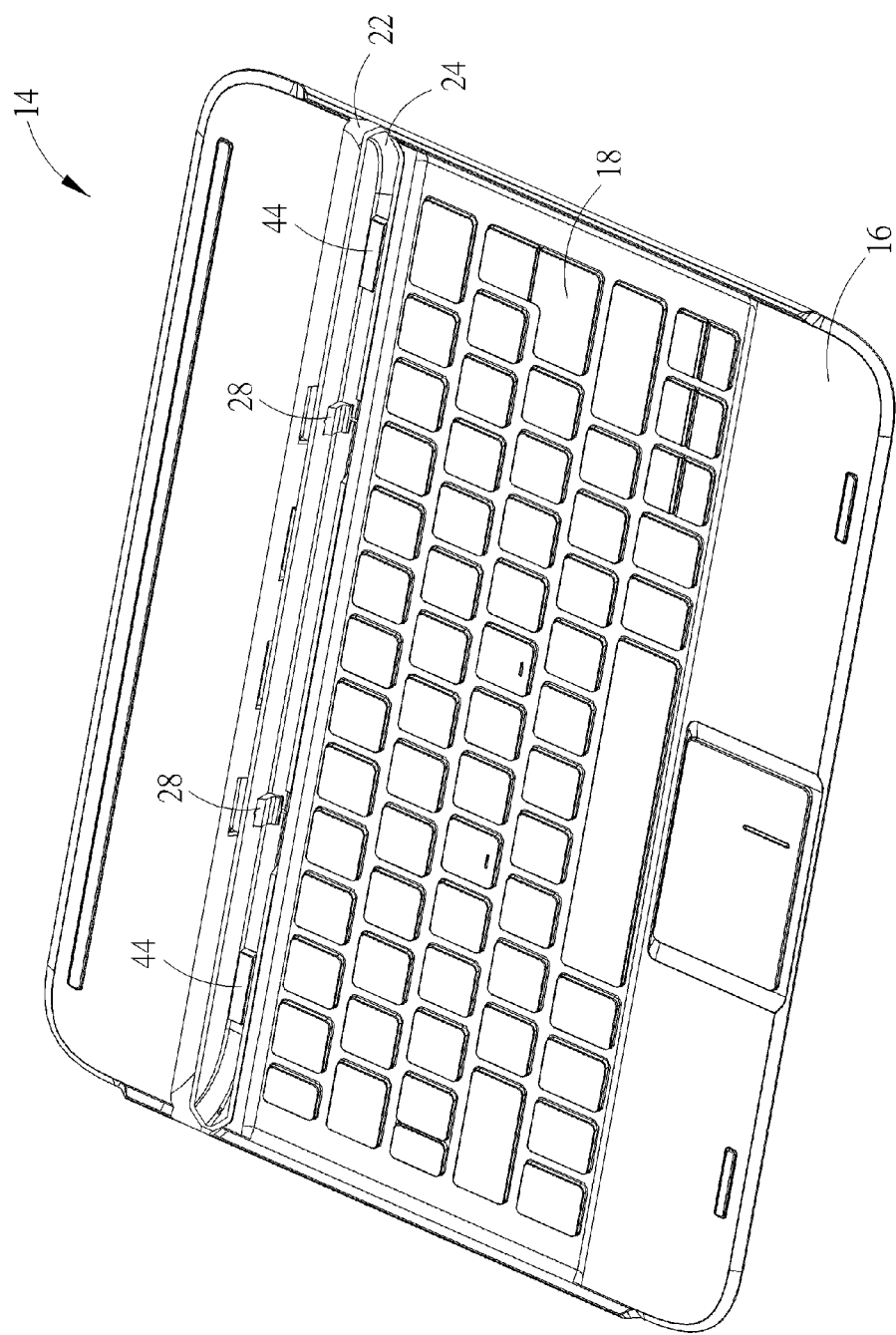
FIG. 2 is a top view of an external electronic device according to the embodiment of the present disclosure.
Figure 3:
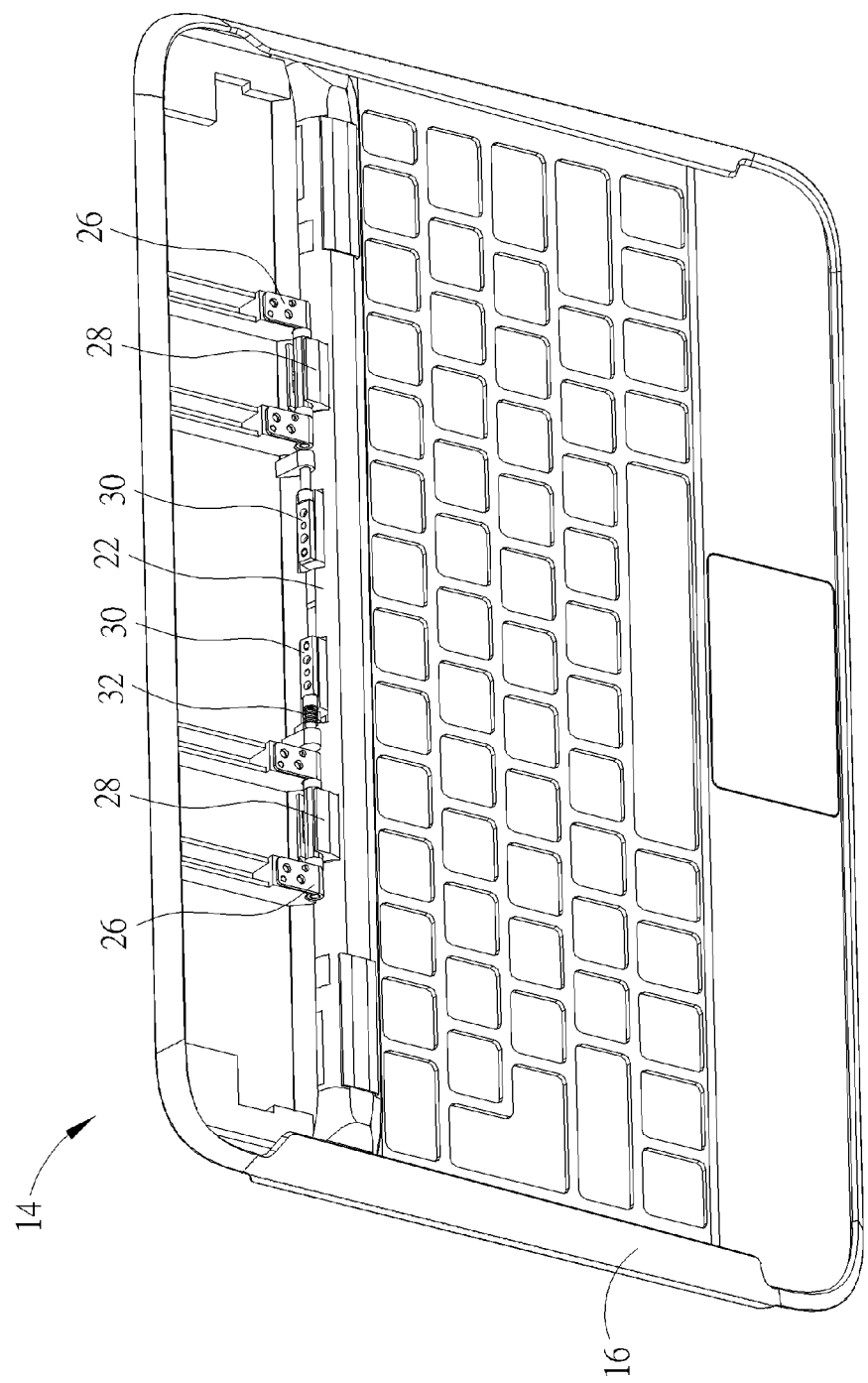
FIG. 3 is a bottom view of the external electronic device according to the embodiment of the present disclosure.

Please refer to FIG. 1 to FIG. 3. FIG. 2 is a top view of the external electronic device 14 according to the embodiment of the present disclosure. FIG. 3 is a bottom view of the external electronic device 14 according to the embodiment of the present disclosure. The fixing mechanism 20 includes a base 22, a supporter 24, a torsional component 26, an actuating component 28, a rotary shaft 30, a resilient component 32, a recovering component 34 and a constraining component 36. The base 22 can be a sunken structure of the casing 16 for accommodating the supporter 24. The supporter 24 can include a connecting terminal (not shown in figures). When the portable electronic device 12 is assembled with the supporter 24, the supporter 24 is electrically connected to the portable electronic device 12 and the input module 18 via the connecting terminal for transmission of the input command. The rotary shaft 30 is rotatably disposed on the base 22 and connected to a bottom of the supporter 24. Two ends of the resilient component 32 are respectively connected to the supporter 24 and the base 22. The resilient component 32 is disposed on the rotary shaft 30. The supporter 24 can rotate relative to the base 22 via the rotary shaft 30 by external force or by resilient force of the resilient component 32.

The torsional component 26 is disposed on the base 22 and provides torsion force by friction gasket or axle hole assembly. The constraining component 36 is disposed on the supporter 24 and passes through a constraint slot 281 on the actuating component 28, so that the actuating component 28 can be movably disposed on a side (the long lateral side) of the supporter 24. The recovering component 34 is disposed inside an accommodating slot 241 on the supporter 24. Two ends of the recovering component 34 are respectively connected to the supporter 24 and the actuating component 28. The actuating component 28 can linearly move relative to the supporter 24 along a direction of the constraint slot 281 by the external force or resilient force of the recovering component 34. The torsional component 26 and the actuating component 28 respectively include a first engaging portion 38 and a second engaging portion 40. The first engaging portion 38 can be engaged with or disengaged from the second engaging portion 40 according to user's operation. For example, the portable electronic device 12 moves the actuating component 28 when assembling with the supporter 24, and the first engaging portion 38 is engaged with the second engaging portion 40; the recovering component 34 moves the actuating component 28 away from the torsional component 26, and the first engaging portion 38 is disengaged from the second engaging portion 40. As the second engaging portion 40 is engaged with the first engaging portion 38, the torsion force of the torsional component 26 is transmitted from the actuating component 28 to the supporter 24, to constrain relative rotation between the supporter 24 and the base 22. As the second engaging portion 40 is disengaged from the first engaging portion 38, rotation of the supporter 24 is not constrained by the torsional component 26.

Figure 4:
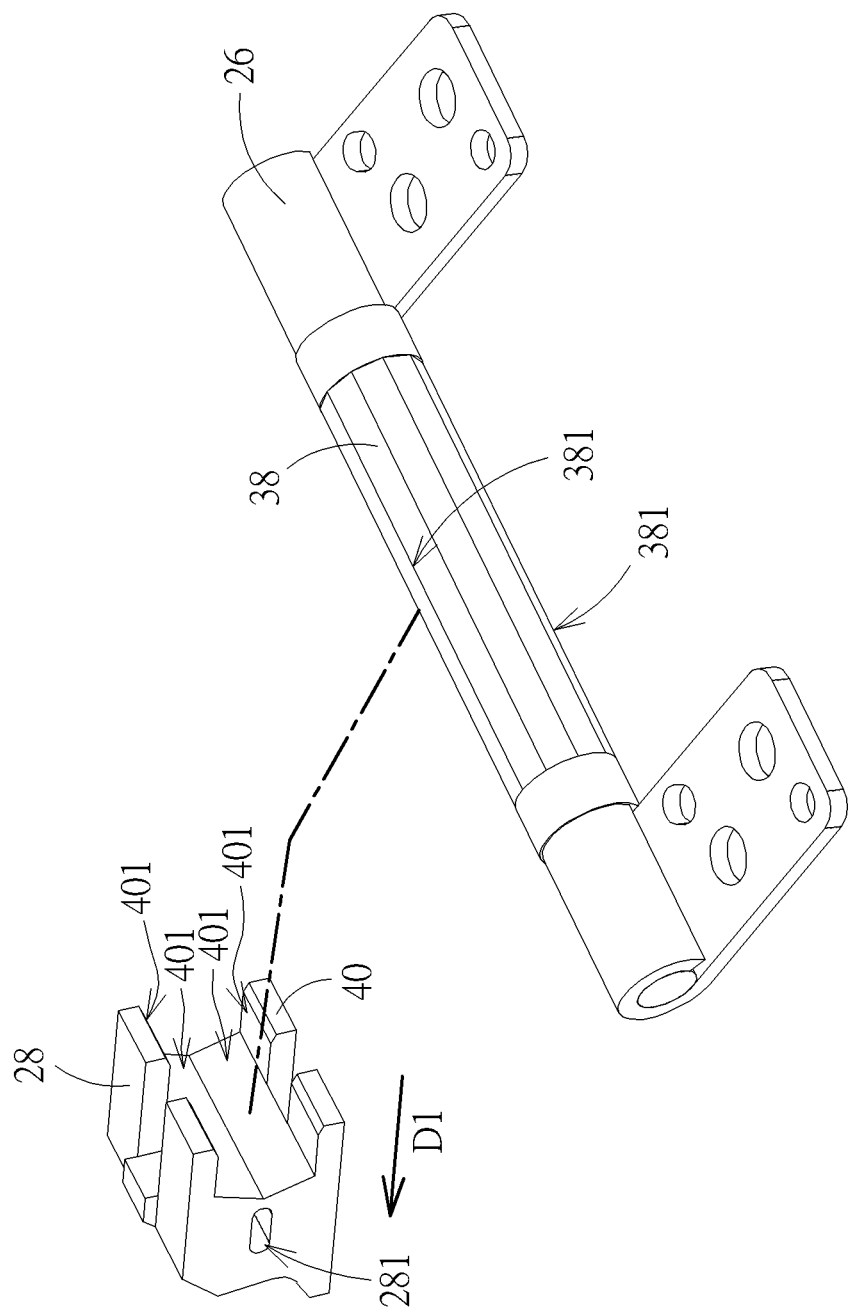
FIG. 4 is a diagram of a torsional component and an actuating component according to a first embodiment of the present disclosure.

Please refer to FIG. 1 and FIG. 4. FIG. 4 is a diagram of the torsional component 26 and the actuating component 28 according to a first embodiment of the present disclosure. The actuating component 28 can move relative to the constraining component 36 (not shown in FIG. 4) along the direction D1 of the constraint slot 281. The first engaging portion 38 of the torsional component 26 can be a polygon structure, such as the hexagon structure or the octagon structure. The second engaging portion 40 of the actuating component 28 can be a clamp structure, which has a plurality of inner surfaces 401. As the second engaging portion 40 is engaged with the first engaging portion 38, at least two inner surfaces 401 of the clamp structure respectively contact against outer surfaces 381 of the polygon structure in a symmetrical manner. The second engaging portion 40 is tightly engaged with the first engaging portion 38, and the actuating component 28 is linked to the torsional component 26 for synchronous motion. When the supporter 24 rotates relative to the base 22, the supporter 24 can be held by the torsion force of the torsional component 26 via the actuating component 28, and the portable electronic device 12 can be fixed at the specific inclined angle.

Figure 5:
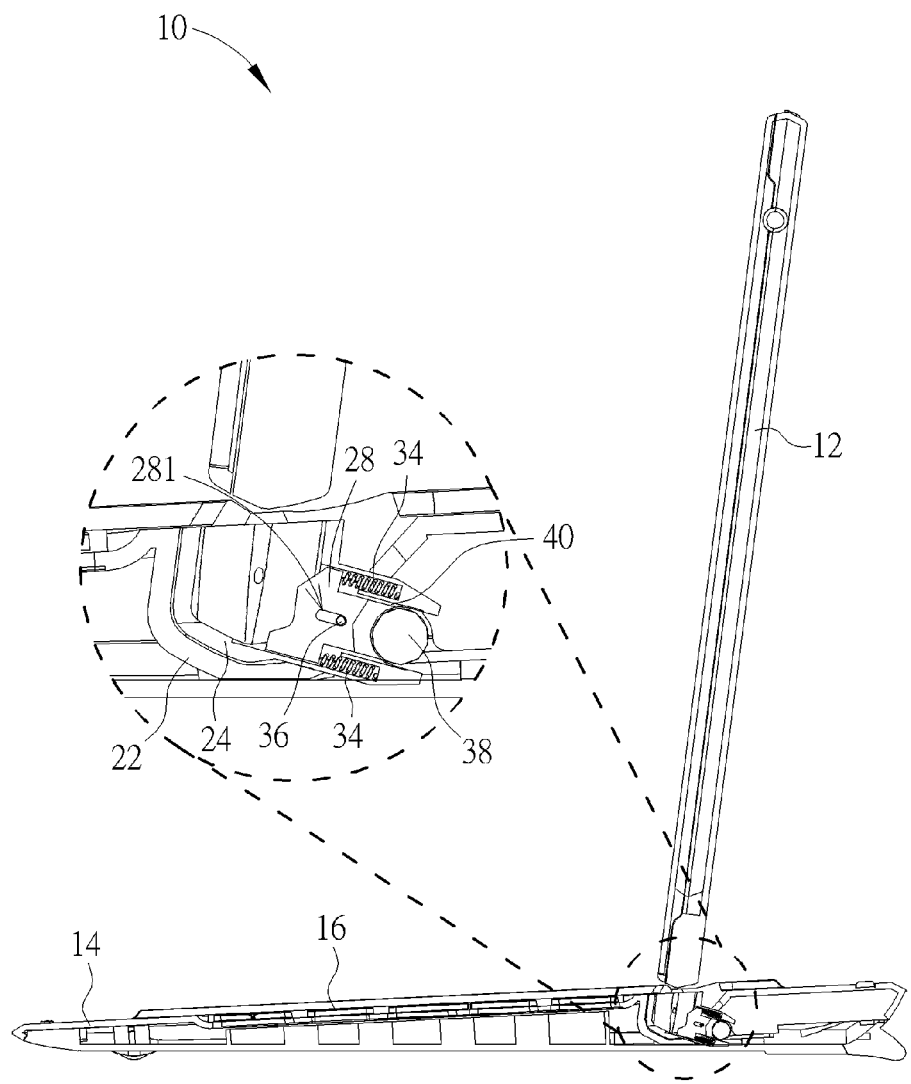
FIG. 5 to FIG. 7 respectively are sectional views of the computer system in different operation modes according to the embodiment of the present disclosure.
Figure 6:
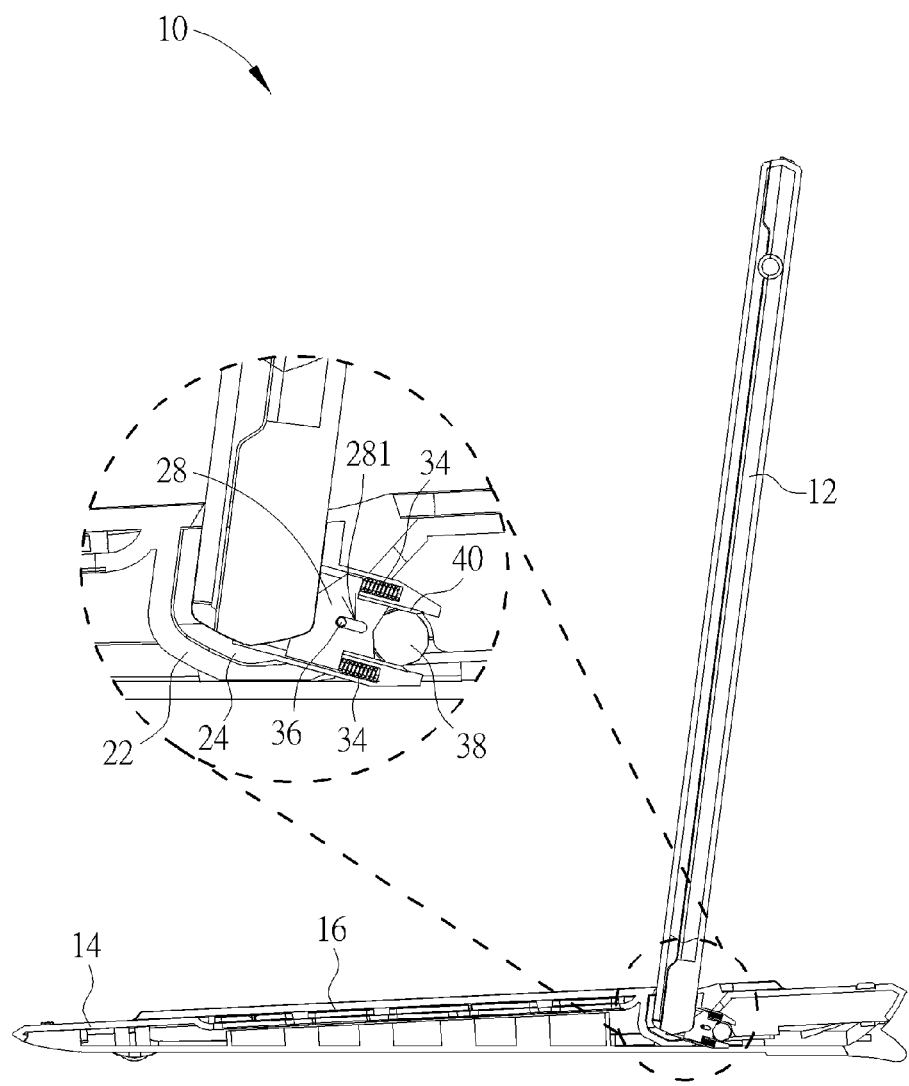
Figure 7:
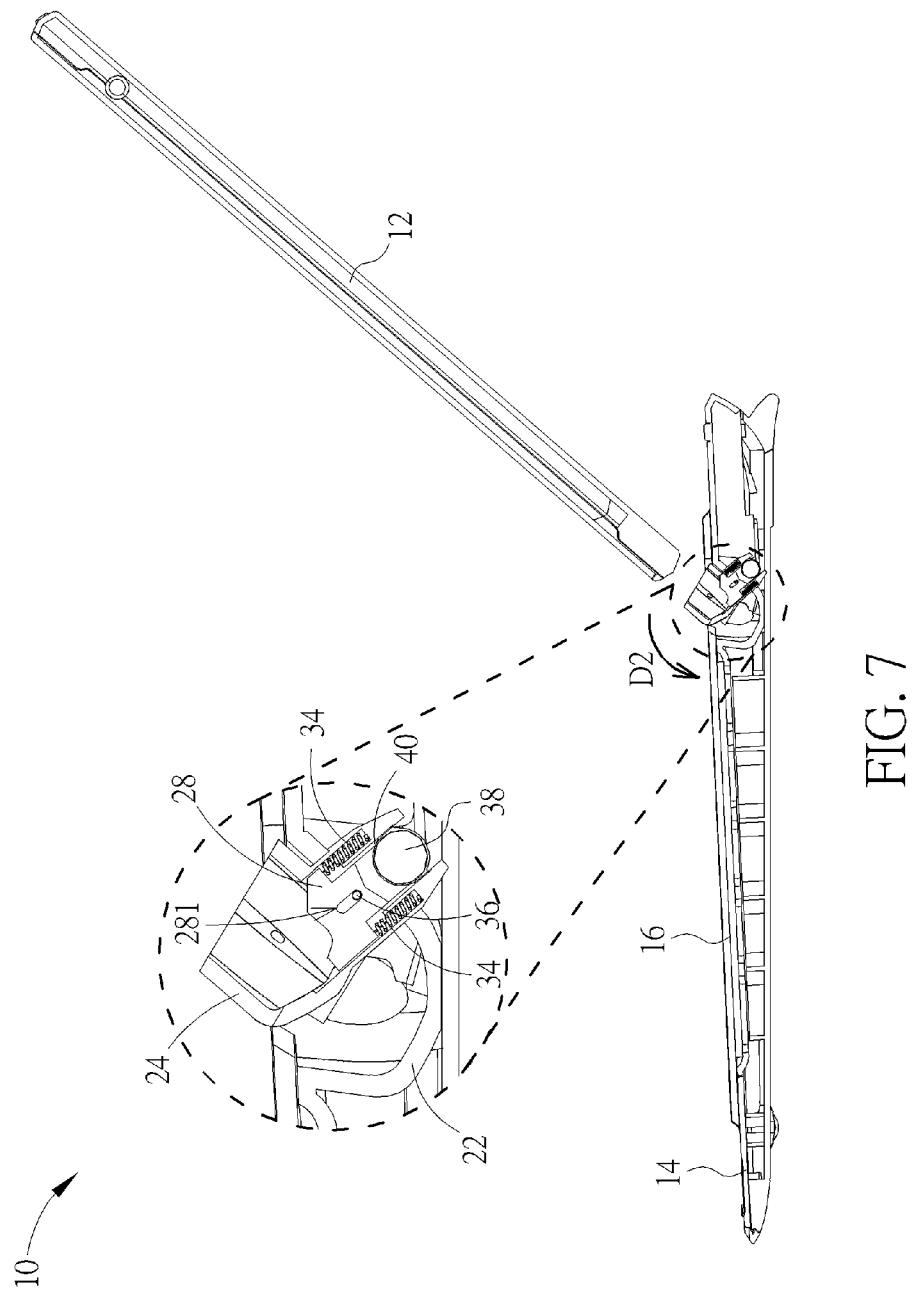

Please refer to FIG. 5 to FIG. 7. FIG. 5 to FIG. 7 respectively are sectional views of the computer system 10 in different operation modes according to the embodiment of the present disclosure. As shown in FIG. 5, the actuating component 28 moves relative to the supporter 24 to the first position, parts of the actuating component 28 inserts into an inner space of the supporter 24. In the meantime, the constraining component 36 contacts against an end (the right end) of the constraint slot 281, the recovering component 34 is at an initial mode without compression, and the second engaging portion 40 is disengaged from the first engaging portion 38. As shown in FIG. 6, the portable electronic device 12 is assembled with the external electronic device 14, a part (the bottom) of the portable electronic device 12 inserts into the supporter 24. The portable electronic device 12 pushes the actuating component 28 to move out of the inner space of the supporter 24, which means the actuating component 28 is located at the second position. Meanwhile, the constraining component 36 contacts against the other end (the left end) of the constraint slot 281, the recovering component 34 is compressed, the second engaging portion 40 is engaged with the first engaging portion 38, the supporter 24 is held by the torsion force of the torsional component 26 via the actuating component 28, and the portable electronic device 12 can be fixed at any inclined angle relative to the external electronic device 12.

As shown in FIG. 7, the portable electronic device 12 is disassembled from the external electronic device 14, and resilient recovering force of the recovering component 34 drives the actuating component 28 to move from the second position shown in FIG. 6 to the first position shown in FIG. 5 and FIG. 7. Position of the actuating component 28 is varied relative to the supporter 24. The recovering component 34 at the initial mode can disengage the second engaging portion 40 from the first engaging portion 38. The torsion force of the torsional component 26 is not applied to the supporter 24, the resilient recovering force of the resilient component 32 can rotate the rotary shaft 30 relative to the base 32, and the supporter 24 rotates at the counterclockwise direction D2. It is to say, the supporter 24 automatically moves from a position protruding from the casing 16 shown in FIG. 7 to a position accommodated inside the casing 16 shown in FIG. 5 in a rotatable manner when the portable electronic device 12 is disassembled from the supporter 24.

Figure 8:
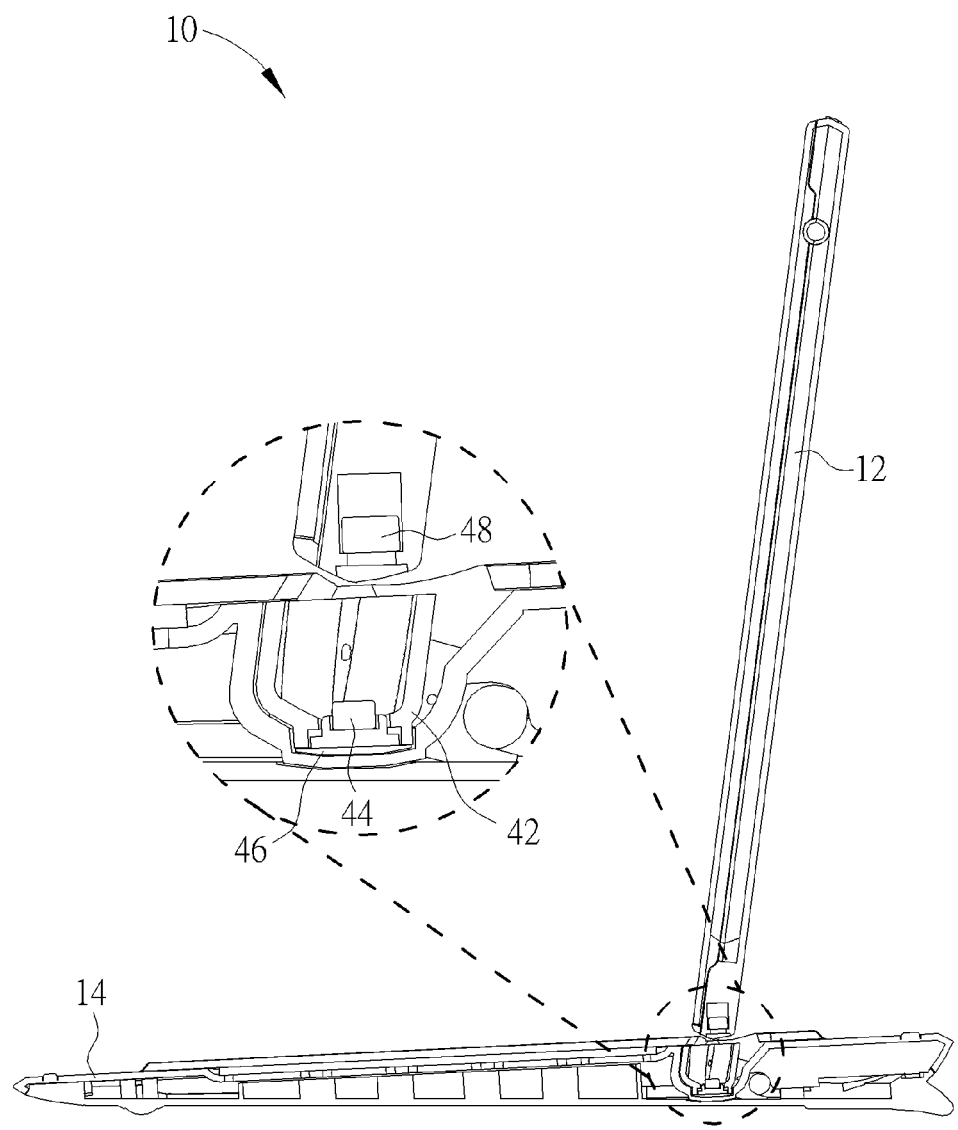
FIG. 8 and FIG. 9 respectively are the other sectional views of the computer system in different operation modes according to the embodiment of the present disclosure.
Figure 9:
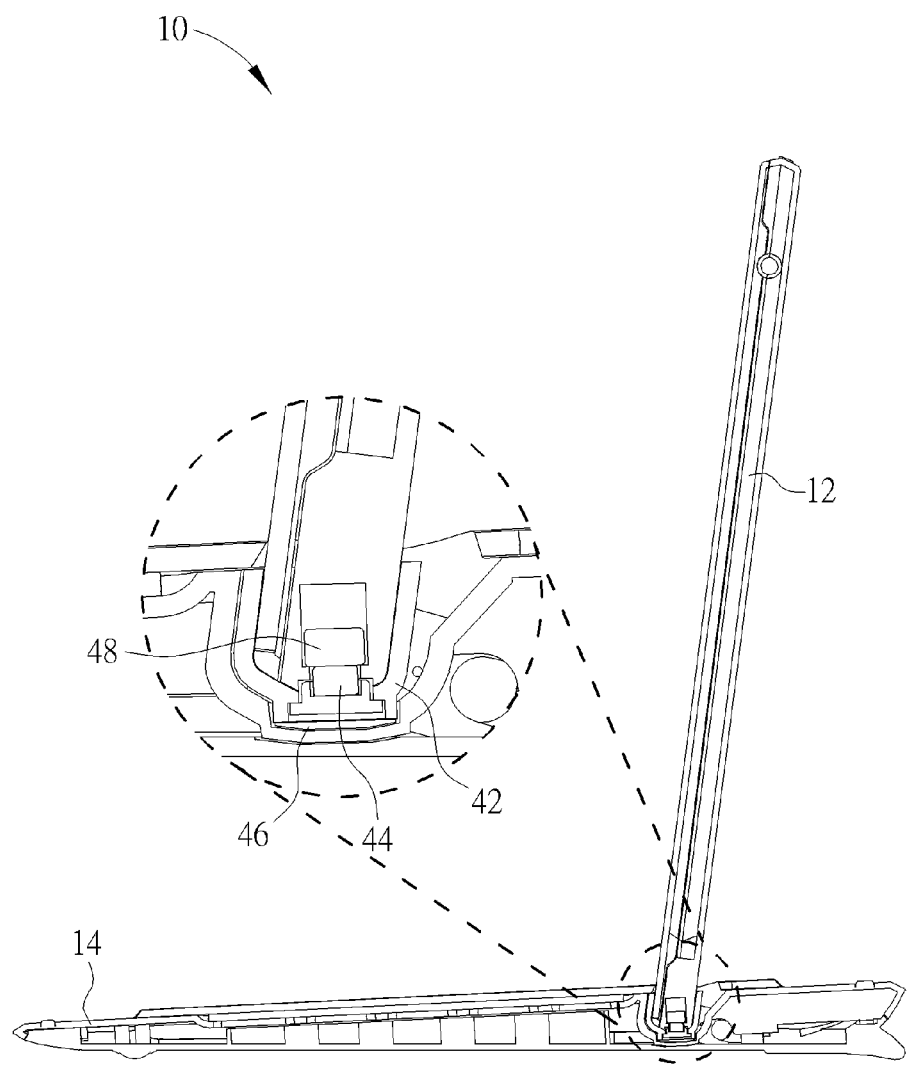

Please refer to FIG. 1, FIG. 8 and FIG. 9. FIG. 8 and FIG. 9 respectively are the other sectional views of the computer system 10 in different operation modes according to the embodiment of the present disclosure. The fixing mechanism 20 of the external electronic device 14 further includes an accommodating structure 42, a first magnetic component 44 and a permeance component 46. The accommodating structure 42 is disposed on the supporter 24. The first magnetic component 44 is movably disposed inside the accommodating structure 42. The permeance component 46 is disposed on a bottom inside the accommodating structure 42. The portable electronic device 12 further includes a second magnetic component 48 disposed inside a casing of the portable electronic device 12. Position of the second magnetic component 48 corresponds to position of the first magnetic component 44. As shown in FIG. 8, the portable electronic device 12 is far from the external electronic device 14, magnetic induction force of the second magnetic component 48 does not affect the first magnetic component 44. Magnetic attraction force is generated by the permeance component 46 and the first magnetic component 44, the first magnetic component 44 is located at the bottom of the accommodating structure 42 to contact the permeance component 46. As shown in FIG. 9, the portable electronic device 12 is assembled with the external electronic device 14, the magnetic attraction force between the second magnetic component 48 and the first magnetic component 44 is greater than the magnetic attraction force between the first magnetic component 44 and the permeance component 46, the first magnetic component 44 moves upward relative to the accommodating structure 42 to be close to the second magnetic component 48. Generally, the first magnetic component 44 directly contacts the second magnetic component 48, so as to increase assembly stability between the portable electronic device 12 and the supporter 24.

Figure 10:
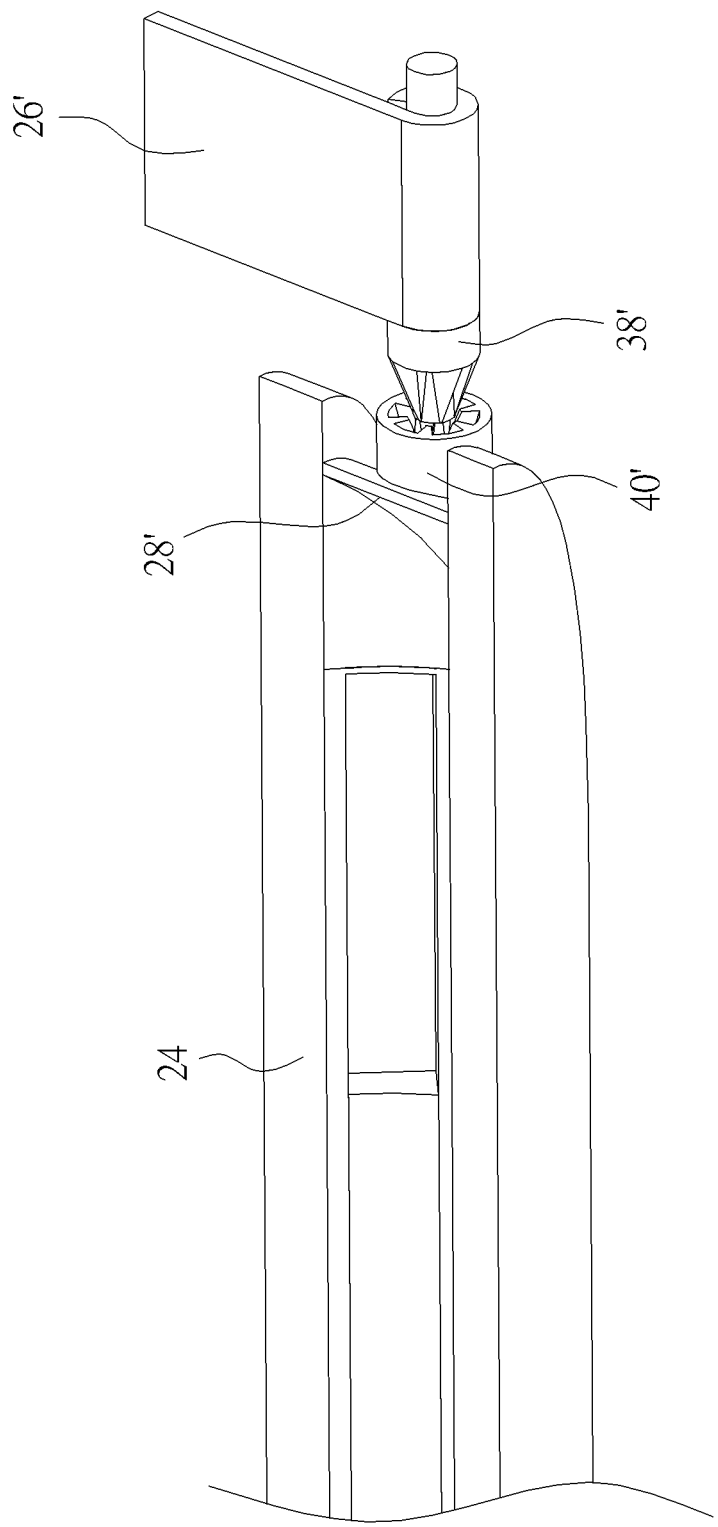
FIG. 10 is a diagram of the torsional component and the actuating component according to a second embodiment of the present disclosure.

Please refer to FIG. 10. FIG. 10 is a diagram of the torsional component 26' and the actuating component 28' according to a second embodiment of the present disclosure. In the second embodiment, elements having the same numeral as ones of the first embodiment have the same structures and functions, and a detailed description is omitted herein for simplicity. The actuating component 28' is movably disposed on an edge side (the short lateral side) of the supporter 24. The actuating component 28' has the second engaging portion 40', which is a sunken structure. The torsional component 26' is disposed on the base 22 (not shown in FIG. 10) and located at an end of the supporter 24. The torsional component 26' has the first engaging portion 38', which is a pillar form. Position of the first engaging portion 38' aligns with position of the second engaging portion 40'. When the portable electronic device 12 (not shown in FIG. 10) inserts into the supporter 24, the portable electronic device 12 moves the actuating component 28' relative to the supporter 24 outwardly, the second engaging portion 40' is engaged with the first engaging portion 38', and the supporter 24 can be held by the torsion force of the torsional component 26' via the actuating component 28'.

It should be mentioned that positions of the actuating component and the torsional component of the present disclosure are not limited to the above-mentioned embodiment. For example, the actuating component can be disposed on the short lateral side, the long lateral side and the bottom of the supporter. The torsional component can be disposed on a position corresponding to the actuating component. Besides, structures of the first engaging portion and the second engaging portion of the present disclosure are not limited to the above-mentioned clamp structure, sunken structure and pillar structure, which depend on inner spatial arrangement and design demand of the external electronic device.

The fixing mechanism of the present disclosure can fix the relative angle between the portable electronic device and the external electronic device. As the portable electronic device is assembled with the external electronic device, the actuating component is pushed by the portable electronic device to link the torsional component, the supporter can be held by the torsion force of the torsional component, and the portable electronic device is fixed at the specific angle. As the portable electronic device is disassembled from the external electronic device, the recovering component drives the actuating component back to the initial position, and the resilient component moves the supporter into the casing, so as to effectively prevent the fixing mechanism and outer components from structural interference. Therefore, the fixing mechanism and the related external electronic device of the present disclosure can provide the torsion force according to assembly of the portable electronic device, and further can automatically store the fixing mechanism according to disassembly of portable electronic device for preferable operational convenience.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. A fixing mechanism comprising:
 a base;
 a supporter rotatably disposed on the base for supporting a portable electronic device;

a torsional component disposed on the base, the torsional component comprising a first engaging portion;

an actuating component disposed on the supporter and movably switched between a first position and a second position, the actuating component comprising a second engaging portion, the portable electronic device being assembled with the supporter to push the actuating component from the first position to the second position, so as to engage the second engaging portion with the first engaging portion; and a resilient component, two ends of the resilient component being respectively connected to the supporter and the base, the resilient component being adapted to rotate the supporter relative to the base when the second engaging portion is disengaged from the first engaging portion;

wherein a rotary angle between the supporter and the base is fixed by the torsional component via the actuating component.

2. The fixing mechanism of claim 1, wherein the actuating component partly inserts into an inner space of the supporter when locating at the first position, the actuating component is ejected from the inner space of the supporter when locating at the second position.

3. The fixing mechanism of claim 1, wherein the first engaging portion is a polygon structure, the second engaging portion is a clamp structure, at least two inner surfaces of the clamp structure symmetrically contact against outer surfaces of the polygon structure.

4. The fixing mechanism of claim 1, further comprising:
a rotary shaft rotatably disposed on the base and connected to the supporter, the resilient component being disposed on the rotary shaft.

5. The fixing mechanism of claim 1, further comprising:
a recovering component, two ends of the recovering component being respectively connected to the supporter and the actuating component.

6. The fixing mechanism of claim 5, wherein the recovering component moves the actuating component from the second position to the first position when the portable electronic device is disassembled from the supporter, so as to disengage the second engaging portion from the first engaging portion.

7. The fixing mechanism of claim 1, further comprising:
a constraining component disposed on the supporter and passing through a constraint slot on the actuating component.

8. The fixing mechanism of claim 1, further comprising:
an accommodating structure disposed on the supporter; and
a first magnetic component movably disposed inside the accommodating structure, the first magnetic component being adapted to move relative to the accommodating structure for being close to a second magnetic component of the portable electronic device.

9. The fixing mechanism of claim 8, further comprising:
a permeance component disposed inside the accommodating structure to generate a magnetic attraction force with the first magnetic component.

10. The fixing mechanism of claim 1, wherein the actuating component is selectively disposed on a long lateral side or a short lateral side of the supporter.

11. An external electronic device for being assembled with a portable electronic device, the external electronic device comprising:
a casing; and
a fixing mechanism disposed on the casing, the fixing mechanism comprising:
a base;
a supporter rotatably disposed on the base for supporting the portable electronic device;

a torsional component disposed on the base, the torsional component comprising a first engaging portion;

an actuating component disposed on the supporter and movably switched between a first position and a second position, the actuating component comprising a second engaging portion, the portable electronic device being assembled with the supporter to push the actuating component from the first position to the second position, so as to engage the second engaging portion with the first engaging portion; and a resilient component, two ends of the resilient component being respectively connected to the supporter and the base, the resilient component being adapted to rotate the supporter relative to the base when the second engaging portion is disengaged from the first engaging portion;

wherein a rotary angle between the supporter and the base is fixed by the torsional component via the actuating component.

12. The external electronic device of claim 11, wherein the actuating component partly inserts into an inner space of the supporter when locating at the first position, the actuating component is ejected from the inner space of the supporter when locating at the second position.

13. The external electronic device of claim 11, wherein the first engaging portion is a polygon structure, the second engaging portion is a clamp structure, at least two inner surfaces of the clamp structure symmetrically contact against outer surfaces of the polygon structure.

14. The external electronic device of claim 11, wherein the fixing mechanism further comprises:
a rotary shaft rotatably disposed on the base and connected to the supporter, the resilient component being disposed on the rotary shaft.

15. The external electronic device of claim 11, wherein the fixing mechanism further comprises:
a recovering component, two ends of the recovering component being respectively connected to the supporter and the actuating component.

16. The external electronic device of claim 15, wherein the recovering component moves the actuating component from the second position to the first position when the portable electronic device is disassembled from the supporter, so as to disengage the second engaging portion from the first engaging portion.

17. The external electronic device of claim 11, wherein the fixing mechanism further comprises:
a constraining component disposed on the supporter and passing through a constraint slot on the actuating component.

18. The external electronic device of claim 11, wherein the portable electronic device comprises a second magnetic component, the fixing mechanism further comprises:
an accommodating structure disposed on the supporter; and
a first magnetic component movably disposed inside the accommodating structure, the first magnetic component being adapted to move relative to the accommodating structure for being close to the second magnetic component.

19. The external electronic device of claim 18, wherein the fixing mechanism further comprises:
a permeance component disposed inside the accommodating structure to generate a magnetic attraction force with the first magnetic component.

20. The external electronic device of claim 11, wherein the actuating component is selectively disposed on a long lateral side or a short lateral side of the supporter.

* * * * *